United States Patent
Allebrod et al.

(10) Patent No.: US 9,631,286 B2
(45) Date of Patent: Apr. 25, 2017

(54) HIGH PERFORMANCE REVERSIBLE ELECTROCHEMICAL CELL FOR $H_2O$ ELECTROLYSIS OR CONVERSION OF $CO_2$ AND $H_2O$ TO FUEL

(71) Applicant: Danmarks Tekniske Universitet, Kgs. Lyngby (DK)

(72) Inventors: Frank Allebrod, Copenhagen S (DK); Christodoulos Chatzichristodoulou, Copenhagen N (DK); Pia Lolk Mollerup, Frederiksberg (DK); Mogens Bjerg Mogensen, Lynge (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 107 days.

(21) Appl. No.: 14/391,555

(22) PCT Filed: Apr. 11, 2013

(86) PCT No.: PCT/DK2013/050102
§ 371 (c)(1),
(2) Date: Oct. 9, 2014

(87) PCT Pub. No.: WO2013/152775
PCT Pub. Date: Oct. 17, 2013

(65) Prior Publication Data
US 2015/0118592 A1    Apr. 30, 2015

(30) Foreign Application Priority Data
Apr. 13, 2012    (EP) .................................. 12164019

(51) Int. Cl.
C25B 9/08    (2006.01)
C25B 1/04    (2006.01)
(Continued)

(52) U.S. Cl.
CPC ................ *C25B 9/08* (2013.01); *C25B 1/04* (2013.01); *C25B 1/10* (2013.01); *C25B 3/00* (2013.01);
(Continued)

(58) Field of Classification Search
CPC .... C25B 9/08; C25B 3/00; C25B 1/10; C25B 1/04; H01M 8/2465; H01M 8/08;
(Continued)

(56) References Cited

U.S. PATENT DOCUMENTS 3,779,811 A    12/1973    Bushnell et al.
4,500,566 A    2/1985    Karas et al.
(Continued)

FOREIGN PATENT DOCUMENTS

CN    101383417 A    3/2009
CN    101978537 A    2/2011
(Continued)

OTHER PUBLICATIONS

Allebrod, Frank et al., "Electrical Conductivity Measurements of Aqueous and Immobilized Potassium Hydroxide" Paper No. 181ELE, International Conference on Hydrogen Production ICH2P-11, Jun. 19-22, 2011, Thessaloniki, Greece.
(Continued)

*Primary Examiner* — Patrick Ryan
*Assistant Examiner* — Aaron Greso
(74) *Attorney, Agent, or Firm* — Knobbe Martens Olson & Bear LLP (57) ABSTRACT

The present invention relates to a reversible electrochemical cell, such as an electrolysis cell for water splitting or for conversion of carbon dioxide and water into fuel. The present invention relates also to an electrochemical cell that when operated in reverse performs as a fuel cell. The electrochemical cell comprises gas5 diffusion electrodes and
(Continued)

a porous layer made of materials and having a structure adapted to allow for a temperature range of operation between 100-374° C. and in a pressure range between 3-200 bars.

13 Claims, 7 Drawing Sheets

(51) Int. Cl.
| | |
|---|---|
| *H01M 8/08* | (2016.01) |
| *H01M 8/0293* | (2016.01) |
| *C25B 1/10* | (2006.01) |
| *C25B 3/00* | (2006.01) |
| *H01M 8/2465* | (2016.01) |
| *H01M 4/86* | (2006.01) |

(52) U.S. Cl.
CPC .......... *H01M 8/0293* (2013.01); *H01M 8/08* (2013.01); *H01M 8/2465* (2013.01); *H01M 4/8621* (2013.01); *H01M 4/8652* (2013.01); *Y02E 60/366* (2013.01); *Y10T 29/49108* (2015.01)

(58) Field of Classification Search
CPC ............. H01M 8/0293; H01M 4/8652; H01M 4/8621; Y10T 29/49108; Y02E 60/366; Y02E 60/50
See application file for complete search history.

(56) References Cited

U.S. PATENT DOCUMENTS

| | | | |
|---|---|---|---|
| 4,526,845 A | 7/1985 | Reiser et al. | |
| 6,811,911 B1 | 11/2004 | Peled et al. | |
| 2001/0016884 A1* | 8/2001 | Sato | G06F 3/0613 |
| | | | 710/29 |
| 2004/0047789 A1* | 3/2004 | Tietz | C01B 13/185 |
| | | | 423/263 |
| 2011/0114496 A1* | 5/2011 | Dopp | H01M 4/8631 |
| | | | 205/109 |
| 2011/0195342 A1 | 8/2011 | Luo et al. | |
| 2012/0024461 A1 | 2/2012 | Gottmann et al. | |

FOREIGN PATENT DOCUMENTS

| | | |
|---|---|---|
| EP | 0 092 766 A1 | 11/1983 |
| EP | 1 724 863 A1 | 11/2006 |
| EP | 2 031 675 A1 | 3/2009 |
| EP | 2 254 180 A1 | 11/2010 |
| WO | WO 2006/066918 A2 | 6/2006 |

OTHER PUBLICATIONS

Allebrod, Frank et al., "Alkaline electrolysis cell at high temperature and pressure of 250° C. and 42 bar" Journal of Power Sources, 2013, pp. 22-31, vol. 229.

Divisek, J. et al., "Improved Components for Advanced Alkaline Water Electrolysis" Int. J. Hydrogen Energy, 1988, pp. 141-150, vol. 13, No. 3.

Fischer, Juergen et al., "Fundamental Investigations and Electrochemical Engineering Aspects Concerning an Advanced Concept for Alkaline Water Electrolysis" AIChE Journal, Sep. 1980, pp. 794-802, vol. 26, No. 5.

Graves, Christopher et al., "Co-electrolysis of $CO_2$ and $H_2O$ in solid oxide cells: Performance and durability" Solid State Ionics, 2011, pp. 398-403, vol. 192.

Norby, Truls "Solid-state protonic conductors: principles, properties, progress and prospects" Solid State Ionics, 1999, pp. 1-11, vol. 125.

Wendt, H. et al., "Cermet Diaphragms and Integrated Electrode-Diaphragm Units for Advanced Alkaline Water Electrolysis" Int. J. Hydrogen Energy, 1985, pp. 375-381, vol. 10, No. 6.

* cited by examiner

HIGH PERFORMANCE REVERSIBLE ELECTROCHEMICAL CELL FOR $H_2O$ ELECTROLYSIS OR CONVERSION OF $CO_2$ AND $H_2O$ TO FUEL

CROSS REFERENCE TO RELATED APPLICATIONS

This application is a U.S. National Phase Application of PCT International Application Number PCT/DK2013/050102, filed on Apr. 11, 2013, designating the United States of America and published in the English language, which is an International Application of and claims the benefit of priority to European Patent Application No. 12164019.7, filed on Apr. 13, 2012. The disclosures of the above-referenced applications are hereby expressly incorporated by reference in their entireties.

FIELD OF THE INVENTION

The present invention relates to an electrochemical cell which can perform either water splitting or fuel synthesis. The present invention relates also to an electrochemical cell that when operated in reverse performs as a fuel cell. The invention further relates to a method of producing an electrochemical cell which can perform either water splitting, co-electrolysis of $CO_2$ and water, or fuel synthesis and when operated in reverse can perform as a fuel cell.

BACKGROUND OF THE INVENTION

The rapidly increasing contribution of renewable energy sources in the electricity grid requires development of efficient energy storage methods. Electrolysis can play an important role for energy storage purposes.

In particular, efficient transformation of excess electricity into fuel, such as hydrocarbons or hydrogen gas, may offer a sustainable solution for the energy requirements of the transportation system without the need for a change in transportation technology and infrastructure.

An electrolysis cell is generally characterized by three component parts: an electrolyte and two electrodes, i.e. a cathode and an anode. When driven by an external voltage applied to the electrodes, the electrolyte conducts ions that flow to and from the electrodes, where the reactions take place. The cathode and anode are characterized by the reduction and oxidation of the species that are present in the cell, respectively. For example, in water electrolysis with an aqueous alkaline electrolyte, water is reduced to hydroxide ions and hydrogen gas at the cathode, while hydroxide anions are oxidized to oxygen gas at the anode. Thus, water electrolysis is a method that uses electricity to drive the otherwise non-spontaneous chemical reaction of dissociation of water into oxygen and hydrogen gas.

Co-electrolysis is a method that uses electricity to drive the otherwise non-spontaneous chemical reaction of producing hydrocarbons or syngas by electrolysis of carbon dioxide and water.

Currently, the research and development of electrolysis cells focuses either on operation at elevated temperatures, i.e. above 500° C., or at low temperatures, i.e. below 150° C.

WO 2006/066918 discloses new proton conducting, solid electrolytes in the form of rare earth orthoniobates or orthotantalates being able to operate in electrolysis cells at high temperatures and in a humid atmosphere.

Ion conductivity has previously been described at high and intermediate temperatures in a number of oxides and oxidic materials.

However, there are no solid conductors or other suitable conductors working satisfactory in the temperature range between 200 and 500° C., i.e. within the range of the "Norby gap", i.e. Norby, *Solid State Ionics* 125, (1999) 1-11. Generally high temperature electrolysis is more commonly pursued with oxide ion conductors, generally limited to temperature above ca. 500° C.

On the other hand Proton Exchange Membranes (PEMs) are limited to operation below ca. 150° C. and require expensive electrocatalysts, such as Pt. Accordingly, there is a need for electrochemical cells that are able to efficiently and reliably operate within intermediate-low temperatures.

Hence, an improved electrochemical cell would be advantageous, and in particular a more efficient and/or reliable electrochemical cell that is able to operate within intermediate-low temperatures would be advantageous.

Further, an improved electrolysis and co-electrolysis cell that can reversibly operate as a fuel cell would be advantageous.

OBJECT OF THE INVENTION

It is an object of the invention to provide an electrochemical cell that can be used for water electrolysis and co-electrolysis, or reversibly used for producing electricity as, e.g. a fuel cell.

It is a further object of the present invention to provide an alternative to the prior art.

In particular, it may be seen as an object of the present invention to provide an electrochemical cell that solves the above mentioned problems of the prior art employing cell materials and a structure adapted to allow for a temperature range of operation between 100-374° C.

SUMMARY OF THE INVENTION

The above described object and several other objects are intended to be obtained in a first aspect of the invention by providing an electrochemical cell comprising: at least two electrodes; a porous layer, wherein the porous layer is located in between the at least two electrodes, wherein the porous layer is adapted to immobilize liquid electrolytes, preferably aqueous electrolytes, in a temperature range between 100-374° C. and in a pressure range between 3-200 bars, thereby allowing for the electrochemical cell to operate within that temperature and pressure range.

Thus, the porous layer, such as a ceramic porous layer, comprises an aqueous electrolyte immobilized in the ceramic porous layer, wherein the electrochemical cell withstands a temperature range between 100-374° C. and in a pressure range between 3-200 bars.

Withstand is defined as to be strong enough not to be harmed or destroyed by the mentioned temperature and pressure range and to be able to operate within the mentioned temperature and pressure range without loss of the immobilized liquid electrolyte. Thus, the structure and the material of the electrochemical cell can withstand the corrosive nature of the electrolyte within the mentioned temperature and pressure range.

Preferably the liquid electrolyte is an aqueous electrolyte.

The invention provides an electrochemical cell that is able to efficiently and reliably operate within intermediate-low temperatures employing materials having a high ion conductivity and high stability within the operational temperature range.

The invention is particularly, but not exclusively, advantageous for obtaining an electrolysis cell that is able to operate providing high current density, e.g. 2.0 A/cm$^2$ at 1.75 V, and high energy conversion rate in a temperature range between 100-374° C., and at elevated pressure, e.g. 3-200 bars. On the contrary commercial cells operate providing a low current density, e.g. 0.175 A/cm$^2$ at 1.75 V.

Electrolysis at high temperature has the disadvantage that a single cell is not suitable for water splitting and at the same time for fuel synthesis. This is due to thermodynamic limitations, i.e. decomposition of the fuel at high temperature. Thus, operation within the temperature range 100-374° C. is also advantageous as it allows for use of the same electrochemical cell for water electrolysis or fuel synthesis processes. By switching the feed to the same cell or similar cell from water to water and carbon dioxide, the electrolysis process is changed from water splitting to fuel synthesis and the products from oxygen and hydrogen gas, to oxygen gas and hydrocarbons such as methanol.

Similar cells may be cells having electrodes with different compositions and having may be different catalysts loaded into these electrodes.

Furthermore, by achieving an operating temperature of 100-374° C. the constraint of using expensive noble metal catalysts may be removed.

Advantages deriving from operation within intermediate temperatures may be several. For example:
- electrocatalysts that are less expensive than for PEM may be used;
- production of hydrocarbon fuel, which is not possible at high temperature, is possible;
- various high temperature degradation mechanisms are eliminated;
- large amounts of waste heat in the temperature range 100-300° C. are available for integration.

In particular, the required pressurization further enables:
- production of pressurized fuel that can be a great advantage in the case of H$_2$ or syngas;
- gas diffusion electrodes that facilitate mass transport.

A further advantage of the cell is that its operation mode can be reversed to a fuel cell, thus producing electricity upon feeding of appropriate gases.

The materials employed in the production of the electrochemical cell (EC) have properties that allow for efficient and reliable operation within intermediate-low temperatures and pressure range between 3-200 bars.

The EC has also a structure adapted to efficiently and reliably operate within intermediate-low temperatures and pressure range between 3-200 bars. The EC structure and materials employed allows for operation at a pressure range between 3-200 bars. Cell operation within this pressure range keeps the electrolyte in a liquid phase, thus allowing, in turn, for increasing of the temperature of operation up to the critical point of water, i.e. 373.946° C. at 217.7 atm.

Within this pressure range, being the electrolyte in the liquid phase, the materials employed for the porous layer and/or the at least two electrodes are chemically resistant to the chosen electrolyte within the chosen temperature range.

The increase of pressure retains the electrolyte, such as aqueous electrolyte, in the liquid phase within the desired temperature range and therefore permits operation of the electrochemical cell within that temperature range.

The EC of the invention comprises a porous layer (PL) holding an electrolyte sandwiched between two electrodes.

In some embodiments at least one of the at least two electrodes is a gas diffusion electrode (GDE).

In some embodiments both electrodes are GDEs.

GDEs are defined herein as electrodes having a solid, such as a solid electron conductor, liquid, such as a liquid ion conductor and gaseous interface allowing for an electrochemical reaction between a liquid and a gaseous phase.

Thus the porous layer comprises the liquid electrolyte.

The porous layer has a structure characterized by the ability of immobilizing a liquid electrolyte allowing the cell to work at a temperature range that includes the "Norby gap", i.e. an area where it is known from literature that there are no solid proton conductors working satisfactory.

The porous layer may be a ceramic porous layer, having the ability of immobilizing a liquid, e.g. aqueous, electrolyte due to, e.g. capillary forces. The porous layer should not be electronically conductive so as to isolate the two GDE on the two opposite sides of the porous layer. In this way high performance of the cell is achieved as electronic shorts between the two opposite GDE are avoided and the faradaic efficiency is kept on a high level. The porous layer should also be resistant to corrosion in acid and/or alkaline conditions, depending on the electrolyte of choice. The material of the porous layer should also have a good chemical and thermal match with the material of the GDE.

The porosity of the porous layer may be microporosity, i.e. having pore diameters of less than 2 nm, mesoporosity, i.e. having pore diameters between 2 and 50 nm, or macroporosity having pore diameters of greater than 50 nm.

Preferably, the porous layer for carrying a liquid electrolyte is a mesoporous layer. Even more preferably the porous layer has pore diameters between 2 and 500 nm, such as between 50 and 500 nm.

In some embodiments at least 50% of the pores of the porous layer have a diameters between 2 and 500 nm, such as between 50 and 500 nm.

In some further embodiments at least 70% of the pores of the porous layer have a diameters between 2 and 500 nm, such as between 50 and 500 nm. In some embodiments the porous layer is an alkaline earth metal titanate.

In some other embodiments the porous layer is Strontium titanate (ST).

ST is a good insulator and offers excellent corrosion resistance in both alkaline or acid environments.

ST has also an excellent thermal and chemical match with a material of choice for the GDE, namely Nb-doped strontium titanate (STN).

Other examples of materials composing the porous layer may be perovskite materials having the formula of $AB_yB'_{1-y}O_{3-\delta}$ with A being a combination of Ca, Sr, Ba, B a combination of Ti, Zr, Hf, Ce, B' being a combination of lanthanide elements, Y, Sc, Ga, and $0<=y<=1$.

Further examples of materials composing the porous layer may also be compounds having the formula $A_yA'_{1-y}O_x$ with A being a combination of Si, Ti, Zr, Nb, Hf, Ce, Ta, A' being a combination of alkaline earths, lanthanides, Y, Sc, Ga, and $0<=y<=1$.

In some embodiments A' may be a combination of rare earth.

The use of Si based oxides may be recommended for acidic electrolytes. Certain carbides may also be used, e.g. tantalum carbide, titanium carbides and MAX phases-based new porous electrically conductive ceramics such as $Ti_2AlC$, $Ti_3AlC_2$ and $Ti_3SiC_2$. Also metal nitrides, such as titanium aluminium nitrides, may be used due to their electrical conductivity combined with corrosion resistance. In some embodiments the porous layer is titanium dioxide.

These materials have the advantage of being resistant to corrosion in both acidic and alkaline environments.

Other compounds, like doped pyrochlore ($A_2B_2O_7$ wherein A is a lanthanide, Y, or alkaline earth and B is a transition metal), and other perovskite-like structures such as Ruddlesden-Popper structured compounds based on the same metal oxides may also be suitable materials for the porous layer due to their good stability in harsh conditions.

The choice of appropriate porous layer may be achieved through computer simulation and/or experimentation.

In the production of the electrochemical cell of the invention the porous layer is sintered between the at least two electrodes.

Following the sintering step, the porous layer is filled with aqueous or liquid electrolyte of choice.

For example aqueous or liquid electrolyte may be aqueous or liquid MOH, $M_2CO_3$, $MHCO_3$, $M_2SO_4$, $MX_2PO_4$, $M_2XPO_4$, $MXO_4$, $MXO_3$, MX where M=H, Li, Na, K, Rb, Cs, and X=Cl, Br, I, or mixture thereof.

The choice of an appropriate aqueous or liquid electrolyte may be driven by the intended use of the cell or by the materials employed as porous layer.

The choice of appropriate aqueous or liquid electrolyte may be achieved through computer simulation and/or experimentation.

In some embodiments at least one of the at least two electrodes comprises a porous layer. When comprising a porous layer the electrodes may be referred to as porous gas diffusion electrodes. In some embodiments this layer is a ceramic porous layer.

The GDE may comprise a layer of porous material, e.g. a porous ceramic also referred to as porous ceramic backbone, which is electronically conductive.

The GDE preferably has an overall high conductivity within the operating temperature range of the cell, i.e. 100-374° C. The GDE has to be corrosion resistant to allow for long lifetime in aggressive environments, e.g. acidic or alkaline environments.

Materials that can withstand corrosive environments under high pressure and temperature may be Nickel or Nickel alloys such as Inconel 600, 625, 690 or similar. Ni—Co such as $NiCo_2O_4$ or Co-spinels are known to be corrosion resistant. Furthermore it could be doped perovskites such as STN.

Other examples of materials may be materials containing metals such as Ni, Co, Mo, Nb, Ta, W, Fe, Cu, Mn, V, noble metals, and alloys thereof.

Further examples may be materials containing ceramics:
$ABO_3$ perovskites with A=combination of alkali metal, alkaline earth, lanthanide, Y, and B=combination of transition metal, lanthanide, Ga, Mg;
$A_3O_4$ spinels with A=combination of transition metals, Mg, Ga, Al;
$AO_x$ with A=combination of transition metal, Zr, Hf, Ce, Y, Sc, alkaline earth, lanthanide, Si, Ga, Al.

In some further embodiments at least one of the at least two electrodes comprises metal doped Strontium titanate.

A preferred example of ceramic backbone for the GDE may be Niobium doped Strontium titanate (STN).

STN has specific properties that are of great advantage.

Sintering of STN at elevated temperature and in reducing atmosphere provide a ceramic layer having good electronic conductivity.

It has been also found that STN electronic conductivity increases with the decreasing of the operating temperature of the cell and reaches a maximum within the temperature range of interest (100-374° C.) with a value of electronic conductivity of the order of 500 $S \cdot cm^{-1}$.

A further advantage of the STN is that the material retains high electronic conductivity values irrespective of the operating atmosphere as long as it is operated at temperatures below 500° C. This is because the oxygen surface exchange rate is practically zero below 500° C., i.e. the surface is not further oxidized in air at the operating temperature of the cell, keeping the STN highly conductive within the temperature range of operation of the cell.

STN is also very corrosion resistant in both alkaline and acidic environments.

GDE may also be a metal based porous GDE. The metal based porous GDE is assembled to the porous layer, suitable for carrying the electrolyte, before sintering.

In some other embodiments at least one of the at least two electrodes comprises metal foam.

In some preferred embodiments at least one of the at least two electrodes comprises Nickel based foam.

Metal based porous GDE comprises oxidation and corrosion resistant materials such as metal based alloys or superalloys. These oxidation and corrosion resistant materials are generally well suited for service in extreme environment. For example metal based porous GDE may comprise Inconel alloys.

Inconel alloys or superalloys form a thick, stable, passivating oxide layer protecting the surface from further attack. Inconel also retains strength over a wide temperature range. A superalloy, or high-performance alloy, usually has Nickel as base alloying element.

In order to increase the specific surface of the Nickel, Inconel or metal-foam, the surface of the same can be loaded with a layer of a Ni—Al or Ni—Zn alloy by an appropriate deposition method such as dip-coating, electrodeposition or infiltration. After deposition, the foam is exposed to a caustic solution, usually KOH or NaOH, to etch out the Al or Zn part of the alloy. This leaves a highly porous and electro catalytically active surface behind which is commonly known as Raney-Nickel. Other Raney metals like Raney-Co, Cu, Mo, Fe, and combinations of them may also be used.

In some embodiments at least one of the at least two electrodes is loaded with a catalyst.

In some embodiments the GDE is loaded with an electrocatalyst.

An electrocatalyst is herein defined as a catalyst that participates in electrolysis reactions. Generally catalyst materials modify and increase the rate of chemical reactions without being consumed in the process. Thus an electrocatalyst is a specific form of catalyst that functions at electrode surfaces or may be part of the electrode or of the electrode surface itself.

The electrocatalyst, in an electrochemical cell, assists in transferring electrons between the electrode and reactants.

The appropriate electrocatalyst can be applied before or after sintering, depending on the thermal stability of the electrocatalyst.

This appropriate electrocatalyst can be applied by several deposition methods, e.g. by electro-deposition, infiltration, dip-coating or painting.

The electrocatalyst may be homogeneous or heterogeneous.

Examples of homogeneous electrocatalysts are, e.g. coordination complexes. Examples of heterogeneous electrocatalysts are, e.g. metal surfaces or nanoparticles of metal such as platinum, rhodium or silver.

Preferred electrocatalysts for the $CO_2$ fixation electrode (cathode of the co-electrolysis cell) are: Pt, Rh, Pd, Ni, Cu, Au, Ag, Zn, Fe, Co, Cd, Mo, W, Ru and combinations of them. These may further comprise: AOx, with A being a combination of Ce, Zr, Zn, Cu, Ni, Fe, Co, Ti, Y, Sc, Na, K, Mg, Ca, Sr, Ba, Ga, Al, lanthanides.

Preferred electrocatalysts for the HER (hydrogen evolution reaction) in the water electrolysis cell are: Co, Mo, Raney-Ni, and other Raney-metals.

Preferred electrocatalysts for the OER (oxygen evolution reaction) in the water electrolysis cell are: Ni, $Co_3O_4$, $NiO_x$, $Fe_3O_4$, Raney-Co, other Raney-metals, $La_{0.5}Sr_{0.5}CoO_3$, $NiCo_2O_3$, $SrCoO_{3-x}$.

In some embodiments when the GDE is a metal based porous GDE the electrocatalytic activity of some metals or alloys, like Nickel for water-electrolysis, may be sufficient, so that no further electrocatalyst is needed. Some of the proposed alloys, like Inconel 625, may have electrocatalysts in their composition and are therefore not only corrosion resistant, but also catalytically active. According to some embodiments of the invention, the electrochemical cell is a co-electrolysis cell producing synthetic fuels from carbon dioxide and water.

In some other embodiments, an electrochemical cell, wherein said electrochemical cell is a co-electrolysis cell producing carbon monoxide and hydrogen gas, i.e. syngas, which is then catalytically converted to synthetic fuels with the help of a catalyst loaded in the cathode GDE.

In this case, i.e. when the electrochemical cell is a co-electrolysis cell producing synthetic fuels from syngas, the catalyst has the function of increasing the rate of chemical reaction between syngas.

For example, in some embodiments water electrolysis produces hydrogen gas at the cathode, the cathode being further loaded with a catalyst that can produce synthetic hydrocarbon fuel when fed with carbon dioxide that reacting with the $H_2$ produces synthetic hydrocarbon fuel under the cell operating conditions.

In some other embodiments, co-electrolysis of carbon dioxide and water leads to carbon monoxide and hydrogen gas at the cathode upon reduction; the cathode being further loaded with a catalyst that can produce synthetic hydrocarbon fuel when CO and $H_2$ react under the cell operating conditions.

In some further embodiments, reduction of $CO_2$ leads to CO formation at the cathode; the cathode being further loaded with a catalyst that can produce synthetic hydrocarbon fuel when fed with water that together with the produced CO produces synthetic hydrocarbon fuel under the cell operating conditions. When the electrochemical cell is a co-electrolysis cell the cathode may comprise the catalyst.

In some embodiments the catalyst is not comprised in the cathode, e.g. is not loaded in the cathode. It may, for example be included in a separate layer connected downstream the cathode, i.e. in a way that the gases evolved at the cathode pass through the catalyst for generation of synthetic hydrocarbon fuel. Preferably when the electrochemical cell is a co-electrolysis cell the porous layer is titanium dioxide.

Titanium dioxide may also work for the water electrolysis cell.

The single electrochemical cells are generally stacked for final use.

The electrochemical cell of the invention may be stacked so as to obtain an electrical conductive and gastight structure.

The above described object and several other objects are intended to be obtained in a second aspect of the invention by providing an electrochemical cell stack comprising: at least two electrochemical cells according to the first aspect of the invention; a bipolar plate located in between the at least two electrochemical cells, wherein the bipolar plate comprises at least one metal foil located in between at least two sheets of metal foam.

For example, to produce a stack unit a bipolar plate is inserted in between two electrochemical cells characterized by the structure of the invention, i.e. GDE/PL/GDE.

The bipolar plate may be formed of two metal foams, e.g. Ni based foam sheets with a thin dense metal foil, e.g. Ni-foil, in between. Alternatively the metal foam may be loaded with a densely sintered perovskite structure as the one referred to for the porous layer. In this way an electrically conductive and gastight structure is obtained where the metal foam may act as gas channel in the stack.

In some embodiments the metal foam may comprise hydrophobic material, e.g. fluoropolymers such as Polytetrafluoroethylene (PTFE) or Perfluoroalkoxy (PFA).

The electrochemical cell stack is adapted to be durable and stable within the temperature and pressure range of operation.

The invention further relates, according to a third aspect of the invention, to a method of producing an electrochemical cell comprising: assembling a porous layer for supporting liquid electrolyte located in between at least two electrodes; pressing the assembly; sintering in reducing atmosphere the assembly; loading an electrocatalyst.

Assembling a porous layer for supporting liquid electrolyte located in between at least two electrodes may be, e.g. multilayer tape casting and lamination. Sintering temperature may be, e.g. at T≥800° C.

Example of reducing atmosphere is, e.g. in hydrogen gas such as 9% $H_2$.

Other examples of reducing atmosphere may be, e.g. Argon and Hydrogen gas or Hydrogen in Nitrogen gas. Reducing atmosphere may be an atmosphere having an inert gas and a reducing gas such as $H_2$.

In some embodiments according to a third aspect of the invention, the method of producing an electrochemical cell comprising the step of loading an electrocatalyst is performed before sintering in reducing atmosphere the assembly. The electrocatalyst in those embodiments has to be able to withstand the sintering process, i.e. does not have to experience undesired degeneration during the sintering process.

An advantage of this method is that the co-sintering of the layer involved reduces the steps needed for the production as the sintering is carried in one single step. A further advantage of the method is that GDEs can be assembled to the electrolyte carrier structure, i.e. the porous layer sandwiched in between at least two GDEs, before the sintering step. This allows for a single sintering step where GDEs and porous layer are co-sintered together.

In some embodiments a single co-sintering step may be used for co-sintering the entire stack.

A further method to produce such an electrochemical cell may comprise mixing an appropriate amount of an electrocatalyst with the base material used to obtain the porous structure for immobilization of the electrolyte. The mixed powder is placed at the interface between the GDE and the powder without electro-catalyst. In a following step the cell is pressed and sintered as described above.

The main idea of the invention is an electrochemical cell having structure and materials adapted to withstand highly corrosive alkaline or acidic environments of the liquid electrolyte at elevated temperatures. Thus, the combination of materials, cell structure and high pressure allows for raising the operational temperature of the cell to a range between 100 to 374° C.

The several aspects of the invention may be implemented by means of computer simulation and/or experimentation.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The electrochemical cell according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
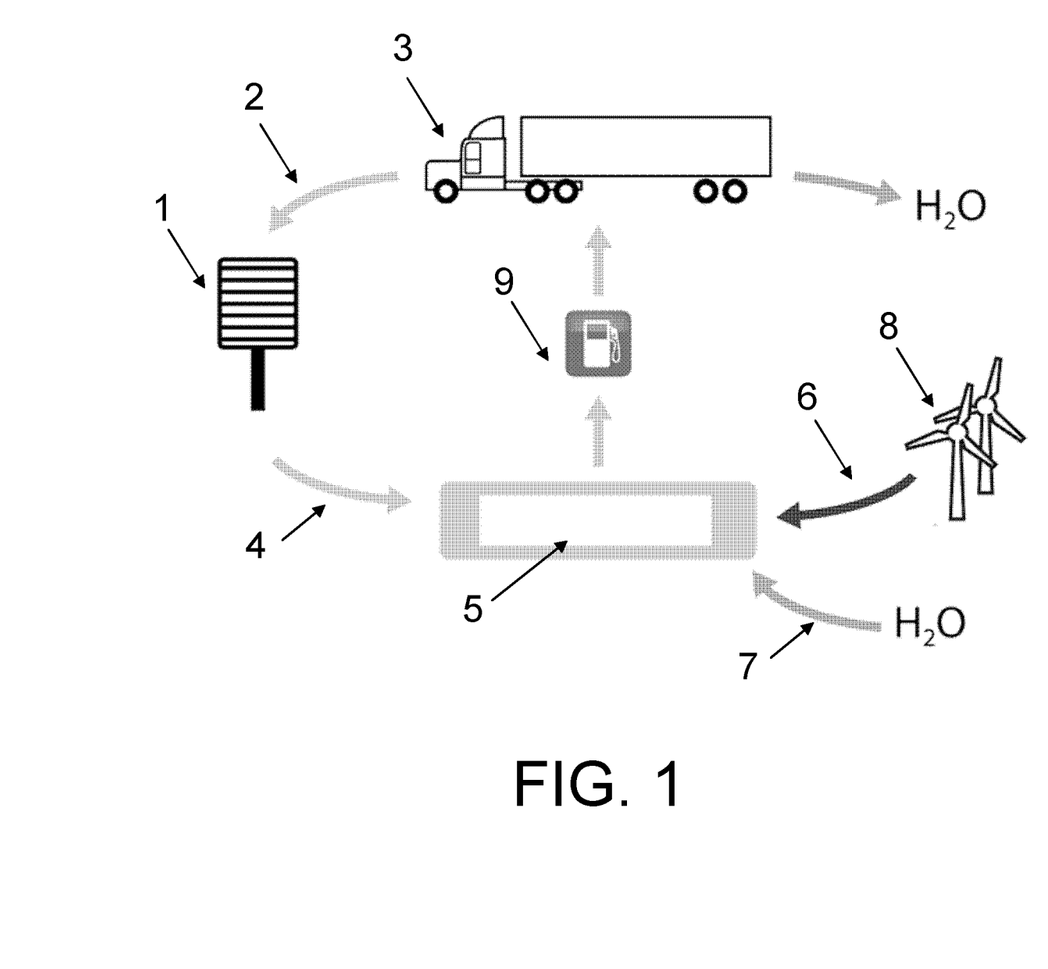
FIG. 1 shows a schematic drawing of the production of fuels by means of co-electrolysis.

FIG. 1 shows the idea behind the use of co-electrolysis for production of fuels. From a source of $CO_2$ such as a $CO_2$ absorber 1, $CO_2$ present in the atmosphere, e.g. released 2 by internal combustion engine in the atmosphere 3, may be collected so as to be fed 4 into a co-electrolysis cell 5. Water is also fed 7 into a co-electrolysis cell 5 and upon application of electrical current 6, e.g. from renewable sources of energy 8, fuel 9, such as methanol can be produced. Through the use of co-electrolysis, as shown in FIG. 1, $CO_2$ and $H_2O$ can be converted into synthesis gas, such as CO and $H_2$ and $O_2$, or directly to $CH_3OH$ or other hydrocarbons.

Figure 2A:
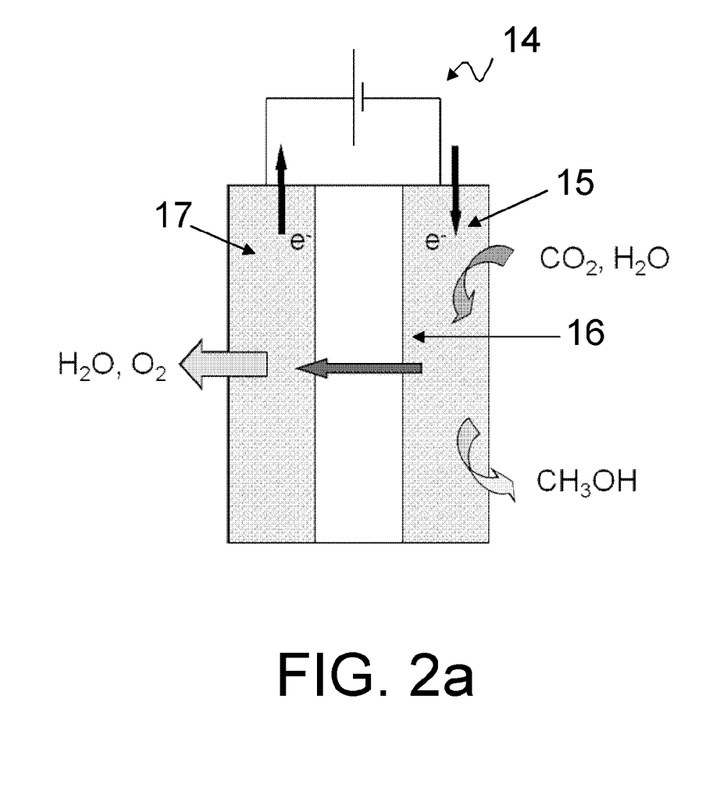
FIG. 2a shows a schematic drawing of an embodiment of the invention, i.e. the co-electrolysis cell.

FIG. 2a shows the electrochemical cell when used for co-electrolysis.

The overall reaction taking place in the co-electrolysis cell is:

$CO_2(g) + 4H_2O(g) + \text{electricity} \iff \text{hydrocarbons}(g) + O_2(g)$

This process produces hydrocarbons, such as methanol, $CH_3OH$ from $CO_2$ and water. As shown in FIG. 2a, water, $H_2O$ and Carbon dioxide, $CO_2$ enter the cell 14 at the cathode, i.e. GDE 15 and are reduced to form methanol Oxygen gas and the co-produced water leave the cell at the anode, i.e. GDE 17 while electrons move through the external circuit.

Other examples of producible hydrocarbons include methane, ethane, propane, ethylene, propene, ethanol, propanol, dimethylether and formaldehyde.

The electrochemical cell of the invention may also produce hydrogen and oxygen from water.

Figure 2B:
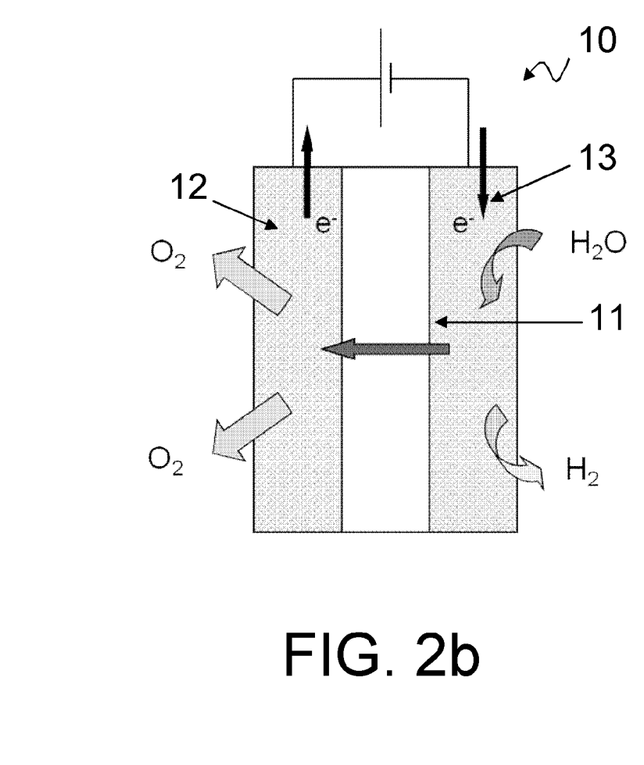
FIG. 2b shows a schematic drawing of an embodiment of the invention, i.e. the electrochemical cell for water electrolysis.

FIG. 2b shows the electrochemical cell when used for water electrolysis. This process splits water into hydrogen and oxygen gas. As shown in FIG. 2b, water, $H_2O$, enters the cell 10 at the cathode, GDE 13 and is split to form protons, $H^+$, and hydroxide anions, $OH^-$. Protons are reduced to form hydrogen gas while the hydroxides move through the porous layer and are oxidized to oxygen gas. The oxygen gas and the co-produced water leave the cell at the anode, i.e. GDE 12 while electrons move through the external circuit.

The key reaction occurs at the surface 11 of the porous layer.

The overall reaction involved in the water electrolysis is:

$2H_2O(g) + \text{electricity} \iff 2H_2(g) + O_2(g)$

Figure 3:
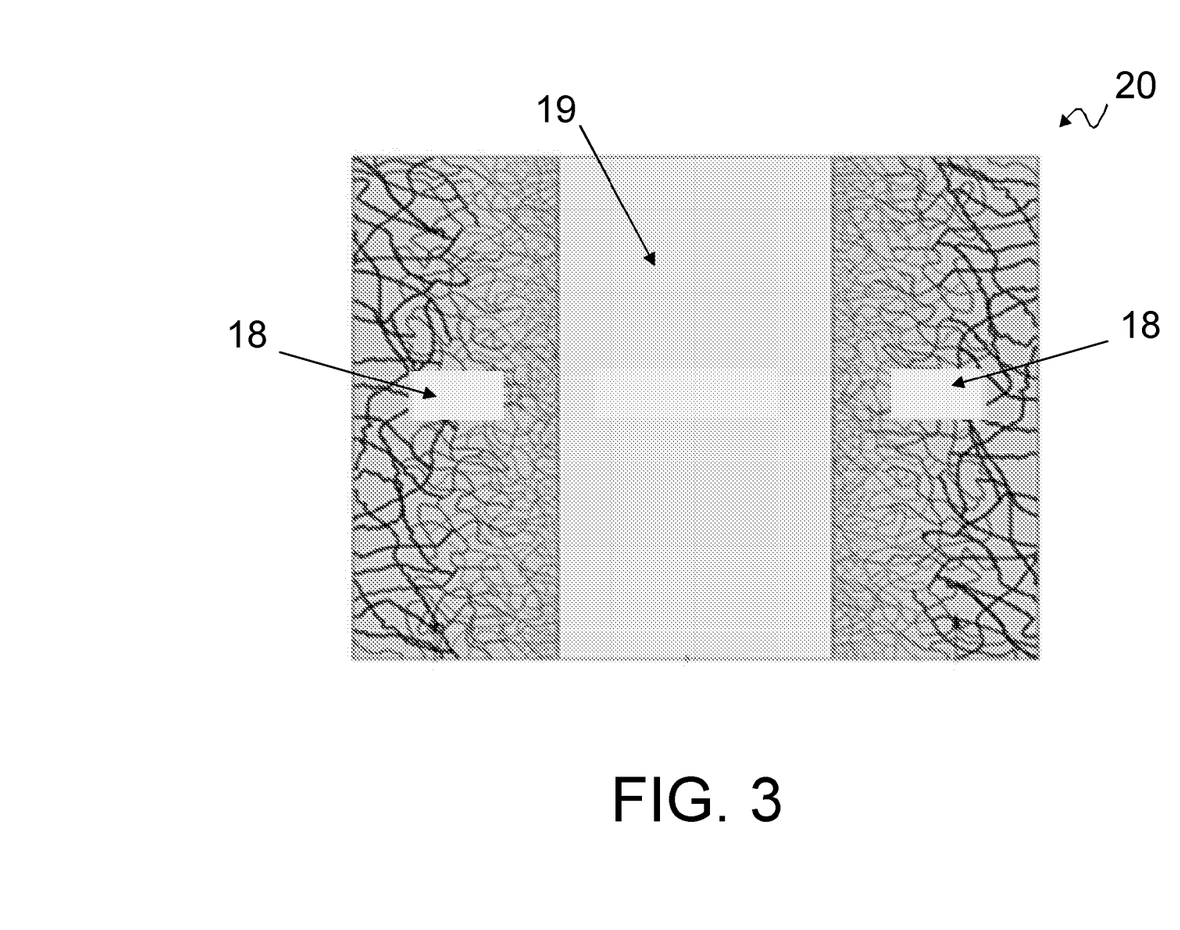
FIG. 3 shows the structure of an electrochemical cell 20 according to the invention.

FIG. 3 shows the structure of an electrochemical cell 20 according to the invention.

A porous layer 19, such as ST, is sandwiched in between two GDEs 18, such as STN. The structure of the GDEs 18 shows porosity so as to allow gas diffusion through the GDEs.

Figure 4:
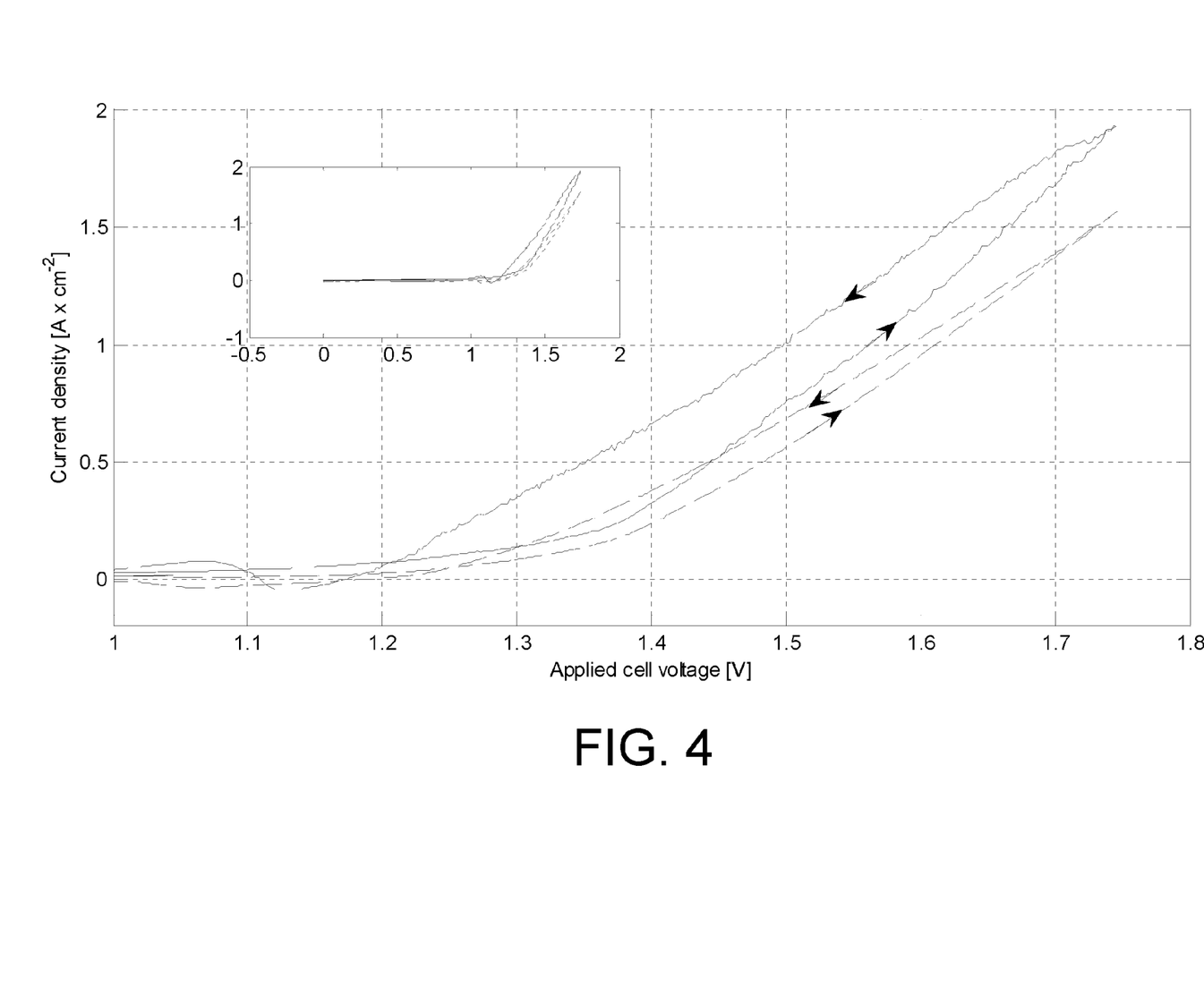
FIG. 4 shows a Cyclic sweep voltammogram for an electrochemical cell according to one embodiment of the invention.

FIG. 4 shows a cyclic sweep voltammogram for an electrochemical cell according to one embodiment of the invention having a Ni-foam/ST/Ni-foam structure. The voltammogram shows the performance of two electrochemical cells, A and B.

The dashed line shows the performance of cell A, composed of an Inconel foam cathode, a nickel foam anode and, mesoporous $SrTiO_3$ with 45 wt % KOH (aq) immobilized electrolyte at 39 bars and 237° C. The full line shows the performance of cell B, composed of an Inconel foam cathode, a nickel foam anode with Ag deposited electro-catalyst and, mesoporous $SrTiO_3$ with 45 wt % KOH (aq) immobilized electrolyte at 241° C. and 37.7 bars. In both cells A and B, the porous layer is ST and the electrolyte used is aqueous KOH; despite the high temperature, the liquid KOH is immobilized in the porous layer.

Both cyclic voltammograms have been recorded with a sweep rate 5 mV/s. The only difference between the two cells is the presence of silver as electrocatalyst.

It can be clearly seen from the cyclic voltammetry that the presence of an electrocatalyst such as silver, increases the performance of the cell.

Figure 4A:
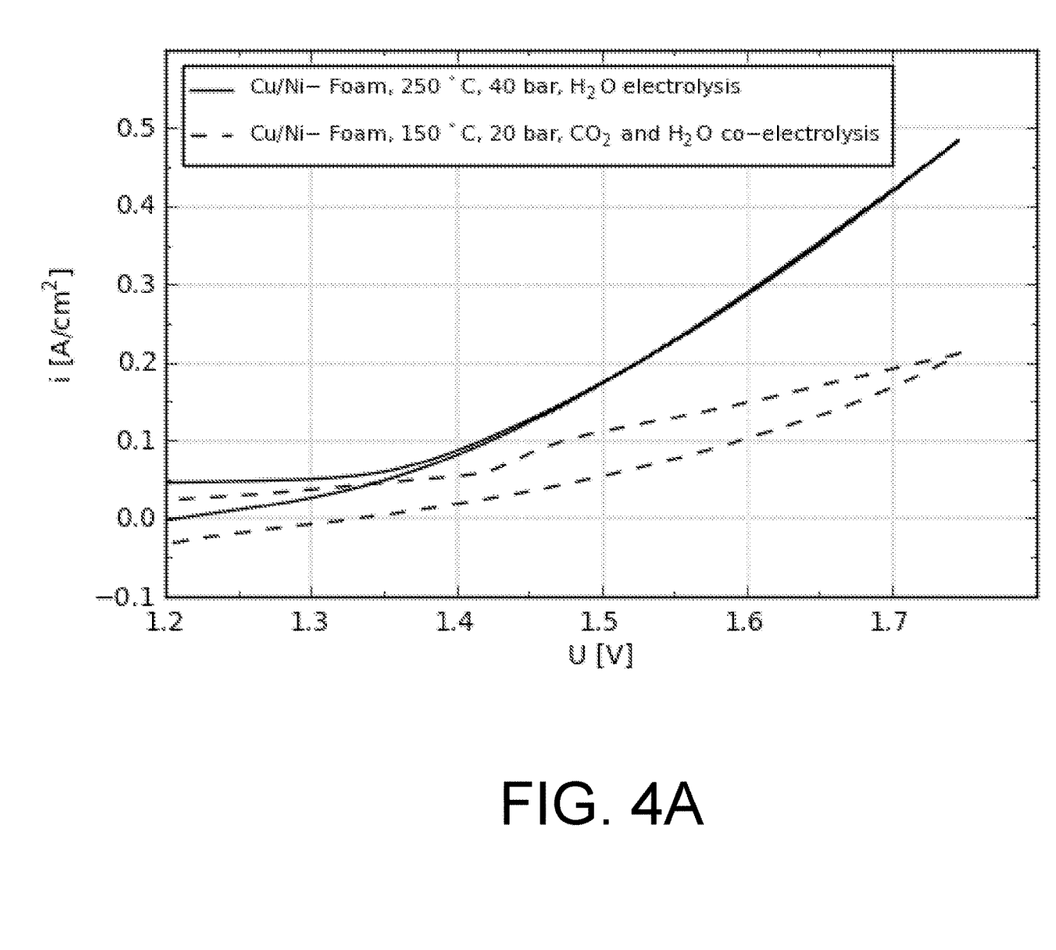
FIG. 4a shows a Cyclic sweep voltammogram for an electrochemical cell according to another embodiment of the invention.

FIG. 4a shows cyclic voltametry analysis of an electrochemical cell produced according to the invention. Cu foam was used as cathode and nickel foam was used as anode. FIG. 4A shows the cell performing electrolysis of $H_2O(g)$ at 250° C. and 40 bar (full line), and co-electrolysis of $H_2O(g)$ and $CO_2$ at 150° C. and 20 bar (dashed line).

An electrochemical cell was produced according to the procedure previously described herein. The anode was Ni-foam and the cathode was Cu-foam, $SrTiO_3$ or YSZ (yttria stabilized zirconia) was used to obtain the porous structure to immobilize the aqueous electrolyte. The cell has been tested by cyclic voltametry at 250° C. and 40 bar with 45 wt % KOH as electrolyte for steam electrolysis and at 150° C. and 20 bar for co-electrolysis of steam and $CO_2$. It was demonstrated that the proposed electrochemical cell operates with a copper foam based gas diffusion electrode (cathode) and a nickel foam based gas diffusion electrode (anode) for both steam and co-electrolysis. Current densities of ca. 500 mA/cm² and ca. 200 mA/cm² were measured for steam electrolysis at 250° C./40 bar and co-electrolysis of steam and CO$_2$ at 150° C./20 bar, respectively, as shown in FIG. 4a.

This test shows that this type of cell can perform both electrolysis of steam and co-electrolysis of steam and CO$_2$.

Figure 5:
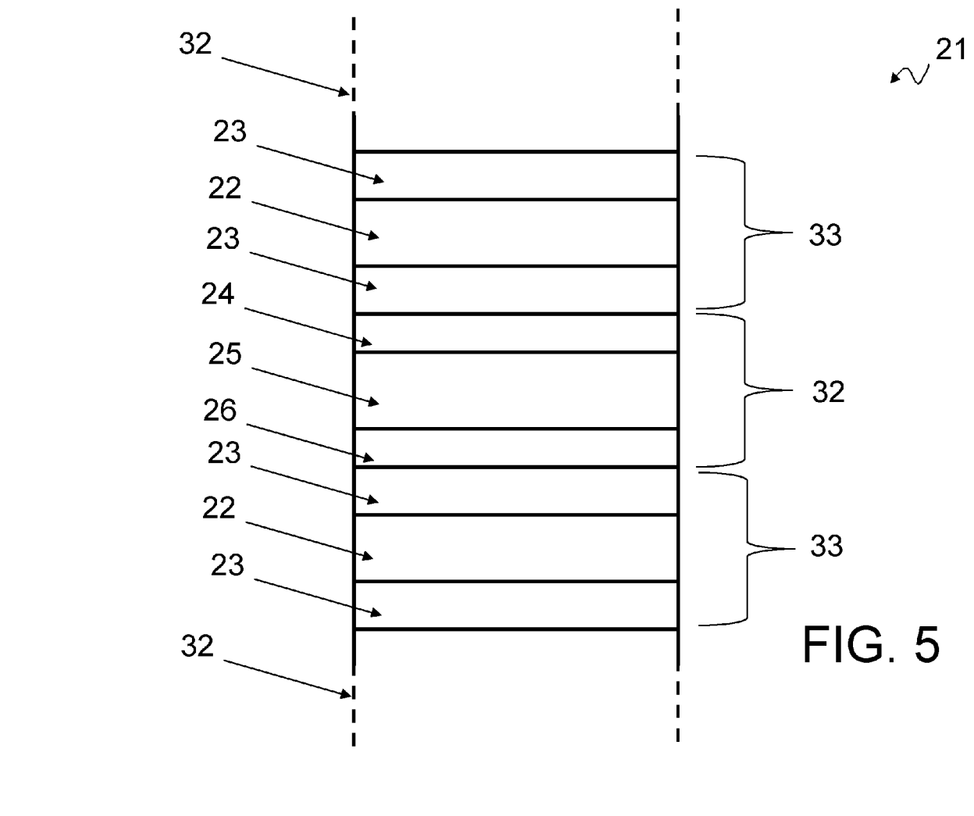
FIG. 5 shows an electrochemical cell stack structure according to one embodiment of the invention.

FIG. 5 shows an electrochemical cell stack structure according to one embodiment of the invention.

The stack is formed by a repetitive structure where electrochemical cells 32, comprising a layer of ST 25 sandwiched in between a layer of metal foam, such as Ni-foam 24 and a layer of Inconel foam 26, are stacked on top of each other and separated by a layer structure 33 comprising a Ni-foil 22 sandwiched in between two layers of coarse Ni-foam 23.

Thus, in general the electrochemical cells are stacked having a thin foil of dense metal in between at least two sheets of coarse metal-foam.

Figure 6:
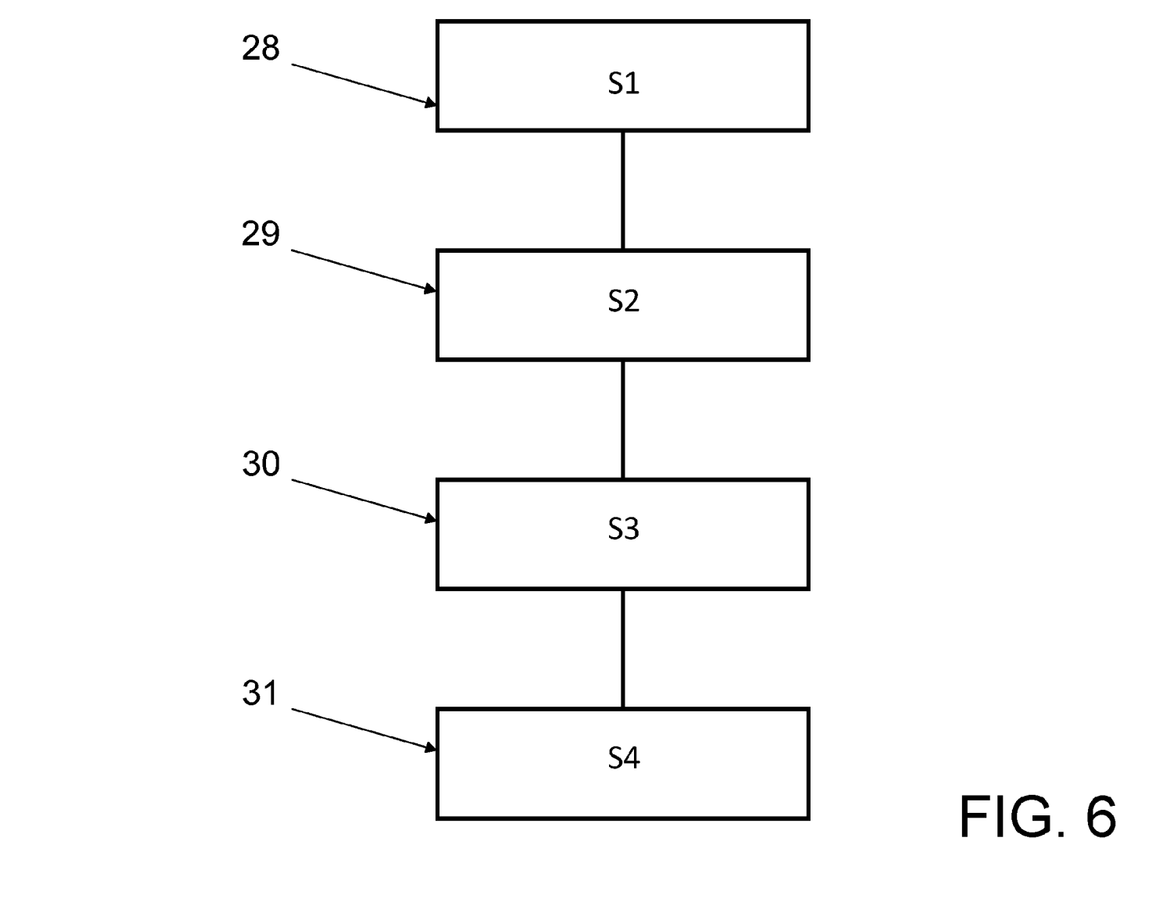
FIG. 6 is a flow-chart of a method according to the invention.

FIG. 6 is a flow-chart of a method of producing an electrochemical cell according to one aspect of the invention.

In step (S1) 28, a porous layer for supporting liquid electrolyte is assembled in between at least two electrodes by, e.g. multilayer tape casting.

In step (S2) 29, the assembly is pressed together.

In step (S3) 30, the cell is sintered in reducing atmosphere, e.g. at T>1000° C. in hydrogen gas such as 9% H$_2$.

In step (S4) 31, the electrocatalyst is loaded into the cell.

In some embodiments according to a third aspect of the invention, step (S4) and step (S3) are inverted so that the step of loading an electrocatalyst is performed before sintering in reducing atmosphere the assembly.

The electrochemical cell of the invention may be reversely operated as a fuel cell. In this case hydrogen gas is fed to the anode and oxygen gas is fed to the cathode.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

What is claimed is:

1. An electrochemical cell comprising:
   at least two porous gas diffusion electrodes, wherein at least one of said at least two porous gas diffusion electrodes comprises doped strontium titanate;
   a ceramic porous layer, wherein said porous layer is located in between said at least two porous gas diffusion electrodes and wherein said ceramic porous layer comprises an aqueous electrolyte in said ceramic porous layer, wherein said ceramic porous layer has pore diameters between 2 and 50 nm; and
   wherein said ceramic porous layer has a perovskite structure having the formula of $AB_yB'_{1-y}O_{3-\delta}$ wherein:
   A is Ca, Sr, or Ba, or a combination thereof;
   B is Ti, Zr, Hf, or Ce, or a combination thereof; and
   B' is Y, Sc, or Ga, or a combination thereof; and
   $0 \leq y \leq 1$; or
   wherein said ceramic porous layer is an alkaline earth metal titanate; or
   wherein said ceramic porous layer is a metal carbide; or
   wherein said porous layer is a metal nitride;
   whereby said electrochemical cell withstands a temperature range between 100-374° C. and a pressure range between 3-200 bars, allowing for said electrochemical cell to operate within that temperature and pressure range.

2. The electrochemical cell according to claim 1, wherein said porous layer has pore diameters that are greater than 50 nm.

3. The electrochemical cell according to claim 1, wherein said aqueous electrolyte is an aqueous solution of MOH, M$_2$CO$_3$, MHCO$_3$, M$_2$SO$_4$, MX$_2$PO$_4$, M$_2$XPO$_4$, MXO$_4$, MXO$_3$, or MX, wherein M is H, Li, Na, K, Rb or Cs, and X is Cl, Br or I.

4. The electrochemical cell according to claim 1, wherein said at least one of said at least two porous gas diffusion electrodes comprises Nickel, a Nickel alloy or Ni—Co.

5. The electrochemical cell according to claim 1, wherein said at least one of said at least two porous gas diffusion electrodes comprises a ceramic material.

6. The electrochemical cell according to claim 1, wherein said at least one of said at least two porous gas diffusion electrodes comprises perovskites with the formula ABO$_3$, wherein A is a combination of an alkali metal, an alkaline earth element, a lanthanide or Y, and B is a combination of a transition metal, lanthanide, Ga or Mg.

7. The electrochemical cell according to claim 1, wherein said at least one of said at least two porous gas diffusion electrodes comprises spinels with the formula A$_3$O$_4$, wherein A is a combination of transition metals, Mg, Ga or Al.

8. The electrochemical cell according to claim 1, wherein said at least one of said at least two porous gas diffusion electrodes comprises a transition metal or Zr, Hf, Ce, Y, or Sc or alkaline earth or lanthanide or Si, Ga, or Al.

9. The electrochemical cell according to claim 1, wherein at least one of said at least two porous gas diffusion electrodes is loaded with a catalyst.

10. A method of using an electrochemical cell according to claim 1 comprising:
    providing the electrochemical cell according to claim 1 and producing hydrogen and oxygen from water with said electrochemical cell.

11. A method of using an electrochemical cell according to claim 1 comprising:
    providing the electrochemical cell according to claim 1 and producing a synthetic fuel from carbon dioxide and water with said electrochemical cell.

12. The electrochemical cell according to claim 1, wherein at least one of said at least two porous gas diffusion electrodes comprises a metal foam.

13. A method of producing an electrochemical cell according to claim 1, said method comprising:
    assembling a porous layer for supporting a liquid electrolyte located in between at least two electrodes;
    pressing said assembly;
    sintering said assembly in a reducing atmosphere; and
    loading an electrocatalyst.

* * * * *